June 20, 1967   M. L. PINKERTON ETAL   3,326,385
VEHICLE-MOUNTED ELECTRIC GUN LOCK
Filed Oct. 19, 1965   2 Sheets-Sheet 1
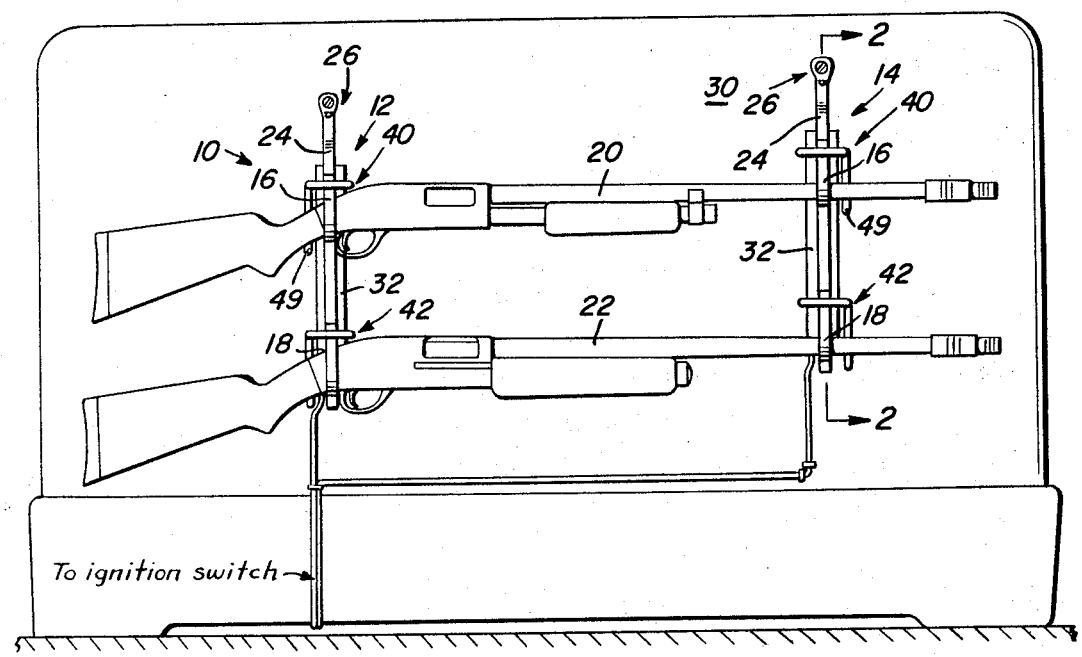
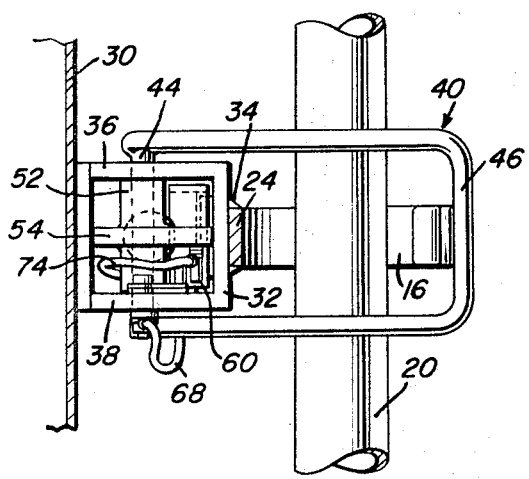
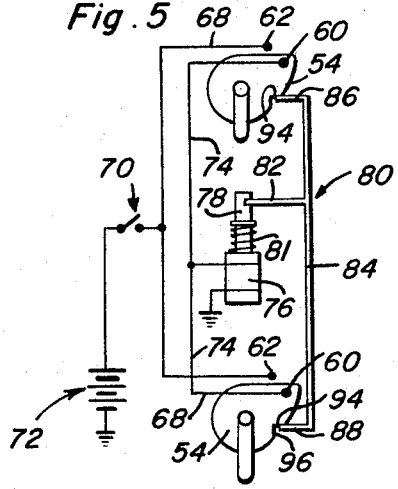
Martin L. Pinkerton
Oscar J. Duderstadt
INVENTORS.
BY Clarence A. O'Brien
and Harvey B. Jacobson
Attorneys June 20, 1967 M. L. PINKERTON ETAL 3,326,385
VEHICLE-MOUNTED ELECTRIC GUN LOCK
Filed Oct. 19, 1965 2 Sheets-Sheet 2
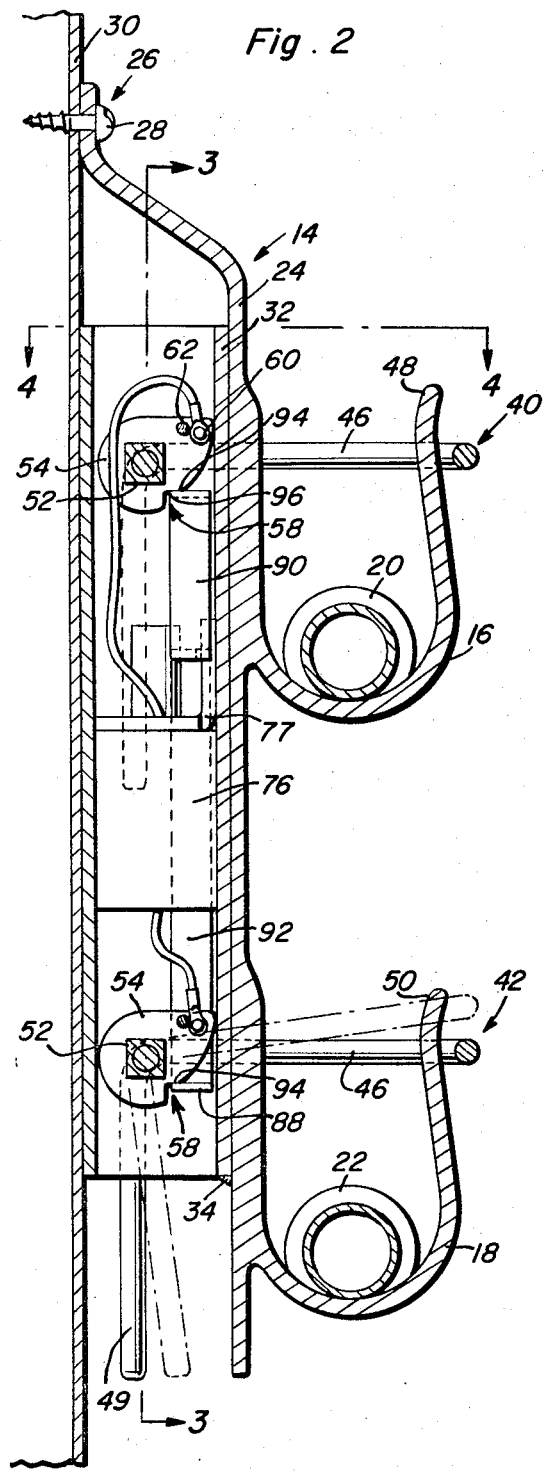
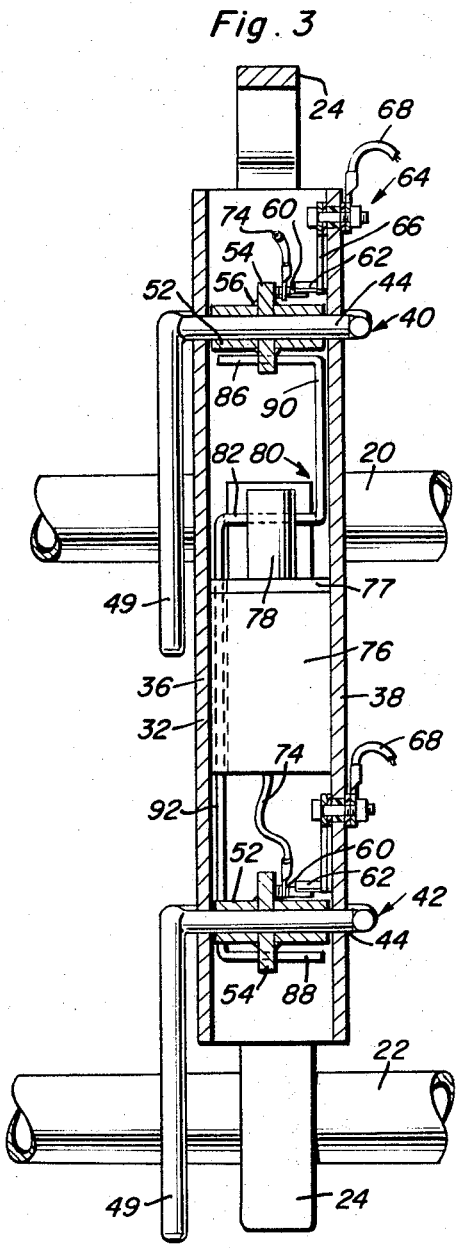
Martin L. Pinkerton
Oscar J. Duderstadt
INVENTORS.
BY *Clarence A. O'Brien*
*and Harvey B. Jacobson*
Attorneys 3,326,385
VEHICLE-MOUNTED ELECTRIC GUN LOCK
Martin L. Pinkerton, P.O. Box 362, and Oscar J. Duderstadt, P.O. Box 713, both of Junction, Tex. 76849
Filed Oct. 19, 1965, Ser. No. 497,746
7 Claims. (Cl. 211—4)

This invention relates generally to gun racks and more particularly to a vehicle mounted rifle rack including electrical locking means therefor operatively connected to the vehicle battery.

Hunters and sportsmen oftentimes use motor vehicles such as cars or trucks for transportation to the area at which they will use their rifles. Their rifles are normally carried in the vehicle and sometimes carried in a rifle rack for supporting the rifles in horizontal spaced apart relationship. Since it is expedient to have means for locking rifles in the rack for safe-keeping, various mechanical locking devices for rifle racks have been developed. However, to my knowledge, no one has developed an electrical gun locking device for gun racks carried on motor vehicles which utilizes the vehicle batteries for the electrical energy source.

Briefly, this invention comprises a rifle rack including locking levers selectively movable over the rifle receiving hooks for locking rifles in the rifle rack. The locking levers have electrical contacts thereon for closing an electrical circuit to activate a solenoid which controls a locking plunger for releasing the locking levers. The electrical circuit also includes the vehicle ignition switch therein and thus the solenoid may be activated only when the ignition switch is closed. Thus, it may be appreciated, as more fully described below, that the locking lever will be retained in locked condition when the ignition switch is colsed and accordingly when the vehicle operator is away from the vehicle he may be sure that the rifle rack cannot be opened unless the ignition switch key is utilized to close the ignition switch.

It is an object of the present invention to provide a rifle rack including electrically operated locking means therefor.

It is another object of the present invention to provide an electrical gun lock for rifle racks which is of simple design and construction and which is extremely efficient and substantially trouble free in operation.

It is a further object of the present invention to provide a rifle rack for mounting on motor vehicles which utilizes the vehicle electrical system for operating a gun lock for use with the rack.

Yet another object of the present invention is to provide an electrical circuit including novel electrical switch means therein for use as an electrical gun lock for rifle racks.

A further object of the present invention is to provide a rack which will retain one or more guns locked therein, in easily removable position, the rack being neat in appearance and relatively inexpensive of construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the rifle of the present invention mounted on an appropriate mounting surface;

FIGURE 2 is an enlarged vertical sectional view taken substantially on the plane of the line 2—2 of FIGURE 1;

FIGURE 3 is a vertical sectional view taken substantially on the plane of the line 3—3 of FIGURE 2;

FIGURE 4 is a horizontal sectional view taken substantially on the plane of the line 4—4 of FIGURE 2; and FIGURE 5 is a schematic diagram of the electrical circuit associated with the device of the present invention.

Referring now to the drawings with more particularity, reference numeral 10 generally denotes the rifle rack comprising the present invention. The rifle rack 10 includes first and second rack sections generally denoted by reference numerals 12 and 14, the rack sections being identical in construction and each including vertically spaced rifle hooks 16 and 18 on the front face thereof. Thus, by viewing FIGURES 1 and 2 in particular, it will be appreciated that rifles 20 and 22 may be retained in the rack 10 extending between the gun hooks 16 and 18 on rack sections 12 and 14. Of course, it will also be appreciated that the barrel portion of the rifles are received in the rack section 14 and the butt sections of the rifles are received in the rack section 12. However, it would be possible to reverse the position of either or both rifles due to the identical construction of the rack sections, and further, it would be possible to add additional gun hooks on both of the rack sections in order to mount additional rifles thereon.

The gun hooks 16 and 18 are provided in outstanding position on the front face of a mounting plate 24, the mounting plate 24 including an upper wall mounting section 26 therein whereby the mounting plate 24 may be mounted by a suitable attaching means such as screw 28 to a preferred mounting surface such as the wall 30. Of course, it will be appreciated that the wall 30 may be any vertical surface, however, as it is anticipated that as the rack 10 will be utilized on a motor vehicle, the surface 30 will comprise an inner wall of a vehicle body such as a motor truck or the like.

Attached to the rear face of mounting plates 24 of both rack sections 12 and 14 are the elongate hollow members 32 of generally square cross section, the members 32 being rigidly connected to the mounting plates 24 as, for example, by welds 34 and normally retained flush against the wall 30 when the mounting plate 24 is attached to the wall. Mounted in the side walls 36 and 38 of the hollow members 32 are upper and lower locking levers generally denoted by reference numerals 40 and 42, respectively. The locking levers 40 and 42 are substantially identical in construction and include the crossbar 44 which extends through the walls 36 and 38 for rotation therein, a generally U-shaped locking portion 46 rigidly connected to the ends of crossbar 44 which extend outwardly of the side walls 36 and 38 and a downturned bar 49 rigidly connected to the juncture of crossbar 44 and locking portion 46. As may be best observed in FIGURES 2 and 4, the U-shaped locking portions 46 of locking levers 40 and 42 are substantially identical and extend about the hooks 16 and 18 in order to close the upper open ends 48 and 50 of hooks 16 and 18. Thus, it will be observed that the locking portions 46 of locking levers 40 and 42 will operate, when in the position illustrated in FIGURE 2 by lines in full, to lock or retain the rifles in the hooks. However, inasmuch as the locking portions are rotatable upwardly as illustrated by the lines in ghost in FIGURE 2, the locking portions 46 may be manually lifted out of locking engagement with hooks 16 and 18, the crossbar 44 rotating in side walls 36 and 38 of member 32, and thus the rifles may be romoved from the hooks.

Referring now to FIGURES 2-5, means are provided for releasably retaining the locking levers 40 in locked position over the hooks 16 and 18. The crossbars 44 have sleeves 52 fixedly mounted thereon between the walls 36 and 38 for rotation therewith. Cam plates 54 are fixedly mounted on the sleeves 52 as for example by welds 56, the cam plates 54 being positioned at the longitudinal center of sleeves 52 and extending substantially perpendicularly thereto. Each cam plate 54 has a locking recess 58 in the forward edge thereof and an electrical contact pin 60 extending from one face thereof. Mounted on the side walls 38 of members 32 are electrical contact pins 62 positioned adjacent the contact pins 60, the contact pins 62 being mounted on wall 38 by mounting means 64 which extend through the wall 38 and which are connected to conductive plates 66. Electrically connected to the mounting means 64 is a lead 68 which is connected through ignition switch 70 to the vehicle battery 72.

Electrically connected to the contact pin 60 by electrical lead 74 is a conventional solenoid 76, the solenoid 76 being mounted in member 32 by mounting plate 77 substantially equidistant between the upper and lower cam members 54. The solenoid 76 includes the usual plunger 78, the solenoid 76 being wired so that the plunger 78 is biased outwardly of the solenoid body by spring 80 when the solenoid is unenergized, the plunger 78 being pulled into the solenoid body upon energization of the solenoid coil.

The solenoid plunger 78 has mounted thereon for vertical movement with said plunger as it is moved vertically in the member 32 upon energization and deenergization of the solenoid coil, a locking pin generally denoted by reference numeral 80. The locking pin 80 is schematically illustrated in FIGURE 5 as including an intermediate leg 82 mounted in a recess in plunger 78, the intermediate leg 82 being connected to a body portion 84, with an upper locking leg 86 and a lower locking leg 88 on the body 84. However, as may be observed in FIGURES 2 and 3, the locking pin 80 is generally S-shaped including the upper locking leg 86, depending leg 90 extending at right angles to leg 86, intermediate legs 82 extending at right angles to leg 90, depending leg 92 extending at right angles to intermediate leg 82 and bottom locking leg 88 extending at right angles to intermediate leg 82 and bottom locking leg 88 extending at right angles to depending leg 92.

Referring now to FIGURES 2 and 5 it will be observed that the upper and lower locking legs 86 and 88 extend into abutting engagement with the upper lip 94 of the locking recesses 58 in cam members 54 when the solenoid 76 is unenergized and the plunger 78 is biased outwardly of the solenoid by spring 80. Thus, it will be apparent that due to this abutting engagement, the cam members 54 may be rotated only slightly due to the play between the lip 96 of recess 58 and the locking legs 86 and 88 but will be restrained from further rotation. It will be noted that due to the locking engagement of legs 86 and 88 in the recesses 58 in cams 54, the locking levers 40 may not be rotated upwardly from their locking position on the hooks 16 and 18 inasmuch as the cams 54 which are fixedly mounted on cross leg 44 are retained in substantially nonrotatable position by the locking legs 86 and 88. At this time, therefore, it is apparent that the rifles 20 and 22 are locked in the hooks 16 and 18.

Referring now to FIGURES 2 and 5 for a description of the operation of the rifle rack 10, it will be apparent that the rifles 20 and 22 are first placed in the hooks 16 and 18 of each rack section 12 and 14 and the locking levers 40 move downwardly over the open ends 48 and 50 of the hooks in order to lock the rifles therein. Of course, the solenoid 76 must be energized in order to rotate the locking levers 40 upwardly to provide access to the hooks 16 and 18, as only when the solenoid 76 is energized will the locking pin 80 be pulled downwardly out of locking engagement with the cams 54. In order to energize the solenoid 76 the vehicle ignition switch 70 must first be closed, and the locking levers 40 be moved upwardly slightly as allowed by the play between the lip 96 of recess 58 and the locking legs 86 and 88, at which time the contact pins 60 and 62 will engage in order to close the switches constituted by the contact pins 60 and 62. Thus, when the switch 70 is closed, and the contact pins 60 and 62 are engaged it will be apparent by viewing FIGURE 5 that the circuit will be completed and the solenoid thus energized. When the solenoid is energized the plunger 78 will be retracted therein, and the cams 54 and hence the locking levers 40 will be unlocked. At this time, the locking levers 40 may be rotated upwardly past the open ends 48 and 50 of hooks 16 and 18 and the rifles 20 and 22 either placed in or removed from the hooks. Of course, it will be appreciated that the vehicle driver may ensure that the locking levers 40 will be retained in locked position merely by turning off or opening the ignition switch 70 when he leaves the vehicle and retaining the ignition key.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. A gun rack comprising, a pair of rack sections, each said rack section having at least one gun hook thereon horizontally aligned with the gun hook on the other rack section, a locking lever swingingly mounted on each said rack section adjacent the hook thereon, each said locking lever being selectively swingable into locking engagement with a gun hook, and electrically operated means for retaining said locking levers in locked condition on said gun hooks.

2. The combination of claim 1 wherein said locking means includes plate means on each said locking lever, said plate means mounted for rotation with said locking levers, each said plate means having a locking recess therein, an electrically operated abutment means for selective movement into said locking recesses whereby rotational movement of said plate means and thus said locking levers is prevented and said locking levers thereby being locked on said gun hooks.

3. The combination of claim 2 including an electrical circuit including an energy source and solenoid means therein, said solenoid means having solenoid plunger means slidably movable therein in response to energization and deenergization of said solenoid means, said abutment means comprising a locking pin operably connected to said solenoid plunger means for movement therewith, said locking pin being movable into locking engagement in said locking recesses when said solenoid means is deenergized.

4. The combination of claim 3 wherein said circuit means includes movable switch contact means on said plate means, stationary switch contact means on said rack section, said plate means being slightly movable when said locking lever is in locked condition thereby enabling said movable contact means to engage said stationary contact means thereby closing said electrical circuit, said solenoid means being wired to move said plunger means into outer or locking position when said movable and stationary contacts are open and into unlocked position when said movable and stationary contact means are closed.

5. In a vehicle mounted gun rack, said vehicle including an electrical energy source and an ignition switch wired in series, the improvement comprising a gun receiving hook on said gun rack, said gun rack having electrical circuit means therein including a solenoid and switch means, said solenoid and said switch means wired in series with said ignition switch and said electrical energy source, means on said gun rack for selectively locking said gun receiving hook, said solenoid including plunger means, locking pin means carried by said plunger means for locking said locking means when said solenoid means is unenergized.

6. The combination of claim 5 wherein the upper end of said gun receiving hook is open, said locking means comprising a locking lever selectively movable into closing engagement with the open end of said gun receiving hook, said locking lever having cam means mounted thereon for movement therewith, said locking pin means being movable into locking engagement with said cam means when said solenoid is unenergized and out of locking engagement with said cam means when said solenoid is energized.

7. The combination of claim 6 wherein said solenoid may be energized by said electrical energy source only when said ignition switch and said switch means are closed.

References Cited

UNITED STATES PATENTS

| 2,552,293 | 5/1951 | Page et al. | 211—4 X |
| 2,855,108 | 10/1958 | Haapala | 211—64 |
| 2,946,452 | 7/1960 | Caloiero et al. | 211—64 X |
| 3,291,317 | 12/1966 | Bowen | 211—64 X |

CHANCELLOR E. HARRIS, *Primary Examiner.*

F. DOMOTOR, *Assistant Examiner.*